United States Patent
Love et al.

(10) Patent No.: US 8,214,337 B2
(45) Date of Patent: *Jul. 3, 2012

(54) DATA MANAGEMENT THROUGH DECOMPOSITION AND DECAY

(75) Inventors: Oriana Jeannette Love, Austin, TX (US); Borna Safabakhsh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/880,381

(22) Filed: Sep. 13, 2010

(65) Prior Publication Data

US 2010/0332455 A1    Dec. 30, 2010

Related U.S. Application Data

(63) Continuation of application No. 12/013,705, filed on Jan. 14, 2008, now Pat. No. 7,912,817.

(51) Int. Cl.
*G06F 7/00* (2006.01)
(52) U.S. Cl. .......... 707/662; 707/665; 707/689
(58) Field of Classification Search .......... 707/689, 707/662, 665
See application file for complete search history.

(56) References Cited

U.S. PATENT DOCUMENTS

| | | | |
|---|---|---|---|
| 5,513,336 A | 4/1996 | Vishlitzky et al. | |
| 6,219,818 B1 | 4/2001 | Freivald et al. | |
| 6,446,188 B1 | 9/2002 | Henderson et al. | |
| 6,609,138 B1 | 8/2003 | Merriam | |
| 6,615,318 B2 | 9/2003 | Jarvis et al. | |
| 6,671,766 B1 | 12/2003 | Vandenbergh et al. | |
| 6,678,793 B1 | 1/2004 | Doyle | |
| 6,732,237 B1 | 5/2004 | Jacobs et al. | |
| 6,757,708 B1 | 6/2004 | Craig et al. | |
| 6,983,318 B2 | 1/2006 | Doyle | |
| 7,020,658 B1 | 3/2006 | Hill | |
| 2002/0078077 A1 | 6/2002 | Baumann et al. | |
| 2002/0083006 A1 | 6/2002 | Headings et al. | |
| 2003/0093483 A1 | 5/2003 | Allen et al. | |
| 2004/0078518 A1 | 4/2004 | Kuwata | |
| 2005/0027803 A1 | 2/2005 | Kelley et al. | |
| 2005/0228958 A1 | 10/2005 | Kawa et al. | |
| 2006/0075007 A1 | 4/2006 | Anderson et al. | |
| 2006/0106852 A1 | 5/2006 | Siddall et al. | |
| 2006/0190830 A1* | 8/2006 | Gerstl et al. | 715/757 |
| 2006/0190924 A1 | 8/2006 | Bruening et al. | |
| 2006/0200700 A1 | 9/2006 | Malcolm | |

(Continued)

OTHER PUBLICATIONS

USPTO; examination correspondence from co-assigned U.S. Appl. No. 10/943,397, filed by Kay Schwendimann Anderson on Sep. 17, 2004, now abandoned.

(Continued)

*Primary Examiner* — Amy Ng
(74) *Attorney, Agent, or Firm* — Robert H. Frantz; Jeffrey S. LaBaw (57) ABSTRACT

Systems and methods for decomposing and decaying data over time by decomposing a type of data item into constituent units of the data item, establishing relationship factors between data items to other data items and between constituent units, creating a shelf-life criterion for the constituent units priority dimensions, calculating or updating a decomposability index for each constituent unit as a function of the priority dimensions while also applying a relationship factor and optionally incrementing for another dimension, and then decaying over time the data items by deleting all constituent units which have decomposability indices exceeding a configured threshold.

19 Claims, 7 Drawing Sheets

U.S. PATENT DOCUMENTS

2008/0155539 A1* 6/2008 Darland et al. ............... 718/100

OTHER PUBLICATIONS

Raxco Software, Inc., "A tutorial on disk defragmentation for windows nt/2000/xp and windows server 2003", http://www.raxco.com/products/perfectdisk2k/whitepapers/defrag_tutorial.pdf, May 2003.

Title: How to set AutoArchive, Date: Sep. 9, 2003, Pertinent pp. 7, Publisher: exchange.sandi.net/info/pdf/How%20to%20set%20AutoArchive%20.pdf, Riding the Wave of Technology.

Leonard et al., "The Design and Implementation of Elastic Quotas: A System for Flexible File System Management", Columbia University Technical Report CICS-014-02, Jun. 2002, retrieved Jul. 6, 2005, http://www.fsl.cs.sunysb.edu/docs/equota-design/index.html, pp. 1-2.

Zadok et al., "Reducing Storage Management Costs Via Informed User-Based Policies", Technical Report FSL-03-01, retrieved Jul. 6, 2005, http://www.fsl.cs.sunysb.edu/docs/equota-policy/index.html, pp. 1-20.

Zadok et al., "Reducing Storage Management Costs via Informed User-Based Policies", retrieved Jul. 6, 2005, http://www.fsl.cs.sunysb.edu/docs/equota-msst/index.html, pp. 1-9.

Title: How to set AutoArchive, Date: Sep. 9, 2003, Pertinent pp. 7, Publisher: exchange.sandi.net/info/pdf/How%20to%20set%20AutoArchive%20.pdf, Riding the Wave of Technology.

Zdonik et al., "The Aurora and Medusa Projects", Bulletin of the IEEE Computer Society Technical Committee on Data Engineering, pp. 1-8, 2003.

Blackwell et al., "Heuristic Cleaning Algorithms in Log-Structured File Systems", In Proceedings of the Winter 1995 USENIX Conference, Jan. 1995.

Chandrasekaran et al., "TelegraphCQ: Continuous Dataflow Processing for an Uncertain World", In Proceedings of the First Biennial Conference in Innovative Data Systems Research (CIDR), 2003.

Gartner et al., "Efficient Bulk Deletes in Relational Databases", In proceedings of the 17th International Conference on Data Engineering, Heidlberg, Germany, Apr. 2001, IEEE.

Gavish et al., "Dynamic File Migration in Distributed Computer Systems" Communications of the ACM, 33 (2):177-189,1990.

Raxco Software, Inc., "A tutorial on disk defragmentation for windows nt/2000/xp and windows server 2003", http://www.raxco.com/products/perfectdisk2k/whitepapers/defrag.sub.--tuto- rial.pdf, May 2003.

Iyer et al., "Anticipatory scheduling: A disk scheduling framework to overcome deceptive idleness in sychronous I/O", In Symposium on Operating Systems Principles, pp. 117-130, 2001.

McKusick et al., "A fast File System for Unix", ACM Transactions on Computer Systems, 2(3): 181-197, Aug. 1984.

Menon et al., "An Age-Threshold Algorithm for Garbage Collection in Log-Structured Arrays and File Systems", IBM Research Report RJ 10120, 1998.

Ousterhout et al., "Beating the I/O bottleneck: A Case for Log-Structured File Sysytems", ACM Operating Systems Review, 23 (1)L 11-28, Jan. 1989.

Patterson et al., "Informed Prefetching and Caching", In Proceedings of the fifteenth ACM Symposium on Operating Systems Principles, pp. 79-95, Dec. 1995.

Rosenblum et al., "TheDesign and Implementation of a Log-Structured File System", ACM Transactions on Computer Systems, 10(1): 26-52, Feb. 1992.

Santry et al., "Deciding when to forget in the Elephant file system", In Symposium on Operating Systems Principles, pp. 110-123, 1999.

Seltzer et al., "An Implementation of a Log-Structured File System for UNIX", In Proceedings of the Winter 1993 USENIX Conference, pp. 1-18, Jan. 1993.

Wang et al., "WOLF—a novel Reordering Write Buffer to Boost the Performance of the Log-Structured File Systems", In Proceedings of the first USENIX Conference on File and Storage Technologies, Monterey, CA,2002.

Wilkes et al., "The HP Autoraid hierarchical storage system", ACM Transactions on Computer Systems, vol. 14, No. 1, Feb. 1996.

* cited by examiner

DATA MANAGEMENT THROUGH DECOMPOSITION AND DECAY

CROSS-REFERENCE TO RELATED APPLICATIONS (CLAIMING BENEFIT UNDER 35 U.S.C. 120)

This application is a continuation of U.S. patent application Ser. No. 12/013,705, filed on Jan. 14, 2008, by Oriana Jeanette Love, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

The present invention relates generally to systems and methods which preserve important data, especially as data preservation applies to systems having resource constraints.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

Data retention and storage for all industries are growing rapidly. Information ranging from customer account information, financial transaction data, online catalogs, literature libraries, historical records, etc., are all being stored online for long periods of time. Much of this information is required to be maintained by law, regulation, or policy, such as tax regulations, securities and exchange rules, or even credit card merchant agreements.

Other types of data which are casually stored long term are also increasing in volume at a rapid rate, such as personal (private) and employee retention of electronic messages ("e-mail") and the wide variety of attachments to those messages (e.g. word processor files, presentation files, movie files, etc.). Such archival storage requirements can be significant when considered over hundreds or thousands of email users.

All of this data must be stored somewhere, such as in a database, or in a file system on a disk drive. In more formal storage environments, a "data warehouse" may be established, using formalized retention policies, storage architectures, and allocating personnel to the data maintenance task.

Data maintenance issues emerge from data systems under constant growth when finite storage limitations are reached. Often this data growth reality is responded to by delaying the data management responsibilities, such as by simply increasing the hardware storage capacity so that larger amounts of data can be maintained.

Although data purging and data archiving methods do exist to control data storage consumption, they are often not sophisticated enough to look at data in small units, each with its own persistence priority. Without this view of data, whole data units, such as entire files, are deleted. This approach is primitive both in terms of resources freed and information integrity maintained.

To illustrate, current techniques for dealing with overloaded email mailboxes involve treating each email message individually, and archiving or deleting it in its entirety based on configurable rules. While these techniques allow the specification of a variety of predicates governing when archiving or deletion is to occur (e.g. period of time, filters based on keyword or origin, etc), the actions available are primitive (relocate, archive, delete) and do not take advantage of the inherent nature of the data.

Another attempt to alleviate long term data storage requirements is to compress data using various compression algorithms. Many of these processes monitor access activities to data units, such as entire folders or individual files, and when access activity becomes sufficiently slow, the processes compress the files or folders. However, the compressed data units are not typically directly usable by their counterpart application programs, so for example, a compressed email file cannot be opened by the originating email program, or a compressed database file cannot be opened by the originating database application. So, most of these processes are triggered to decompress the compressed files when an application program attempts to access the data unit. This approach has several disadvantages, including that it severely slows response time to access the compressed data while waiting for decompression to complete, and it does little to alleviate data storage requirements for data units which are occasionally accessed (e.g. often enough to keep compression from being performed). Techniques for lossless compression, while they can help to reduce the space occupied by a piece of data, don't ultimately solve the problem, because the data will continue to grow, but lossless compression has limits.

SUMMARY OF THE INVENTION

The present invention encompasses systems and methods for decomposing and decaying data over time by decomposing a type of data item into constituent units of the data item, establishing relationship factors between data items to other data items and between constituent units, creating a shelf-life criterion for the constituent unit's priority dimensions, calculating or updating a decomposability index for each constituent unit as a function of the priority dimensions while also applying a relationship factor and optionally incrementing for another dimension, and then decaying over time the data items by deleting all constituent units which have decomposability indices exceeding a configured threshold.

BRIEF DESCRIPTION OF THE DRAWINGS

The following detailed description when taken in conjunction with the figures presented herein provide a complete disclosure of the invention.

DETAILED DESCRIPTION OF EXEMPLARY EMBODIMENTS OF THE INVENTION

The inventors of the present invention have recognized and solved problems previously unrecognized by others in the art of data maintenance, retention, archival, and selective deleting.

The inventors have discovered certain methods and techniques to address the limits of constantly increasing data with finite resources which can be used separately from existing selective archival and compression processes, or may be used separately from these traditional methods.

For the purposes of this disclosure, the process will be termed as "Data Decomposition and Decay", in order to highlight both the dissolution of larger components of data, as well as slow decay and removal of the data. It should be noted by the reader that there is another definition for the term "Data Decompostion", which refers to breaking large data units (e.g. large files, large databases) into smaller accessible parts in order to enable parallel processing on each smaller part. However, this should not be confused with the data decomposition processes of the present invention, which selectively retains and selectively deletes data.

Our data decomposition process offers a unique approach to gracefully degrade existing parts of data, making way for incoming and more important data. By strategically shedding layers of lesser-priority data, more space exists for the higher-priority data. Clearly this solution does not create more storage space, rather, it allows data priority to bias what may occupy the available space and ensure that the highest priority data remains as long as possible.

Concepts of Our Data Decomposition and Decay Techniques

Decomposition and decay naturally occurs within biology and other related sciences. Consider how decomposition takes place: living matter gently looses its characteristics overtime. For example, consider a piece of fruit through various stages of its existence, from being just-picked to having completely decayed. At different times in between these two extremes, various levels of fruit flesh and/or fruit skin are decayed or missing, while the remaining fruit flesh, skin and stem remain. In the end state, however, a "core" remains—the seed. The core can be viewed as the "most important" portion of the fruit, as it is an essential part of the life cycle of the plant which bore it.

The rate of this decomposition of a piece of fruit is determined by a combination of several factors including temperature, oxygen, scavengers, and other such influences.

However, the inventors have realized that there is no natural decomposition and decay of data. Once it is stored, it is essentially permanent and eternal unless it is explicitly modified. The inventors, therefore, have applied the concept of natural decomposition and decay in a manner quite novel to the information technology arts.

For example, by applying the methods of the invention, a bulky email message may be slowly decomposed by gradually shedding (e.g. deleting from storage or archiving) its attachments, subject, and header portions in order make more room for its "core" or prioritized body threads and header snippets. Additionally the factors that influence the rate of this email decomposition might include reproducibility, importance, staleness, etc.

Reproducibility refers to the ability to reproduce the data, either through processing or through retrieving other copies of the data. For example, a set of data which is a result of trend analysis on stock trading data is reproducible if (a) the stock trading data is maintained, and (b) the process used to analyze it is retained. Thus, if the result data is deleted, it can be reproduced by re-processing the stock trading data when needed. Or, data can be reproducible if it is known that other copies are archived elsewhere, such as deleting a folder of "sent" email messages where it is known that the recipient folders of those messages will retain the messages longer.

Importance refers to a manually or automatically set level of importance. For example, a user interface may be provided to allow a user to set an importance factor for each data item, or each part of a data item, such as ranging from "0" for (e.g. never delete, always preserve) to "99" (e.g. very low preservation priority). As will be readily recognized by the reader, this type of scale can be reversed (e.g. 0 for low priority, 99 for highest priority), and it can be modified in range and value set (e.g. 1-10, A-Z, etc.) as may be suitable for various embodiments. Still in other embodiments, quantified narrative levels may be employed (e.g. "keep always", "keep if possible", "keep until X months old", "keep until <DATE>", etc.) Further, according to another aspect of the invention, importance can be inherited and automatically assigned (or overridden), as well, according to relationship factors between data items and between constituent units of the data items. For example, if a "cc" field in an email is considered by the user to be relatively unimportant (e.g. importance factor of "70"), but the system also ranks the message as highly reproducible because the carbon copy of the message is to be used as the source to reproduce the message, then the system may override the user's designation to set the importance level of the "cc" field higher (e.g. "25"), as it is needed to retrieve a copy from inbox which received the carbon copy. Or, in another example, a first portion of data such as a verbatim quote may be user-designated as very important, but the user may not designate any importance for a related footnote. In such a case, the system can "inherit" the importance factor from the quote to the footnote so that the footnote is also preserved at the same importance level as the quote itself.

System Overview

The following disclosure makes intuitive inferences about the nature of information and applies the new methodology for decomposing the information into granular parts, similar to that of naturally occurring decomposition of matter. In order for this idea to hold its most significant value, the following assumptions should be true regarding the nature of data within the system being handled by the invention:

(a) The amount of data is not static, it is usually growing. The idea of data decomposition is most productive in environments that have a finite amount of space, yet experiencing increasing amounts of data to fill that space.

(b) Not all the data is of the same priority. If all data (and its decomposition units) are of equal importance, then decomposition is of less value.

With these assumptions in mind, data storage systems which accumulate data over time, such as emailing systems that constantly accept incoming data, and which have varying importance of data are ideal candidates for benefit from the invention. For the remainder of this disclosure, example embodiments of the invention will be given relative to an email system, but it will be readily recognized by those skilled in the art that the invention is not limited to implementation with or cooperation with email systems, but may equally well be applied to other types of systems, such as but not limited to electronic data interchange ("EDI") transaction storage systems, historical cataloging systems, etc.

Figure 1:
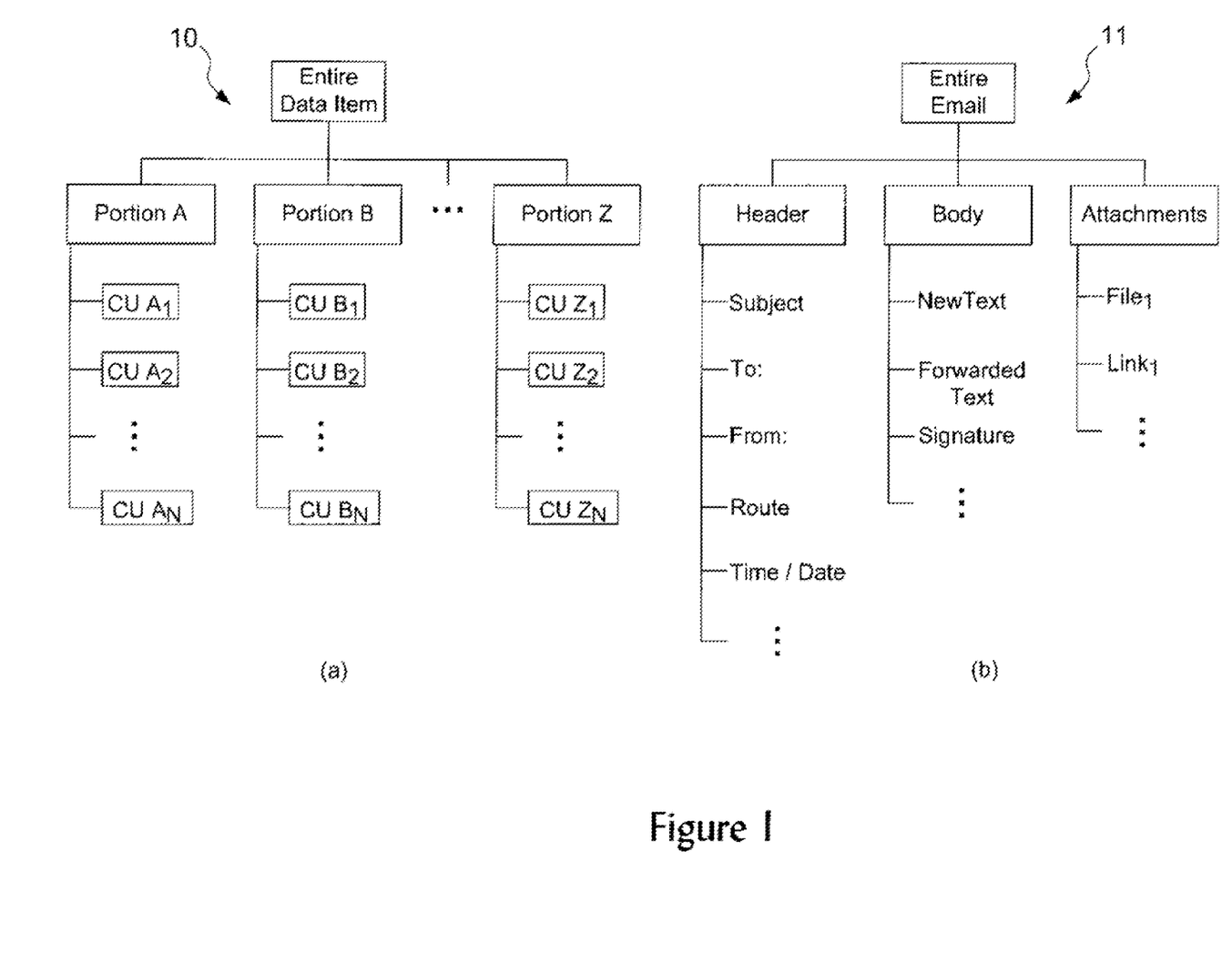
FIGS. 1a and 1b set forth decomposition schemes of whole data items into constituent units.

Currently, data that must be contained within a finite space is subjected to an expiration timeline. For example, emails may expire 90 days after their conception date, resulting in their deletion or archival of the entirety of the email. By "entirety" of the email, we are referring to storing or deleting all parts of the email, such as header portions (subject line, addressee, sender, routing information, etc.), body portions (new text, forwarded text, etc.), and attachments (files, videos, links, etc.). We will refer to these components or portions of each data item (e.g. the whole email) as "constituent data units", wherein the concept of breaking all larger data items (e.g. database records, EDI transactions, etc.) can be applied to breaking them into smaller constituent units. FIGS. 1a and 1b show such a construct.

FIG. 1a shows a generalized view (10) of an entire data item of some sort, which is broken in to portions (portion A, portion B, . . . portion Z), and in which each portion is further decomposed into constituent units (CU $A_1$, CU $A_2$, . . . CU $A_N$, . . . CU $Z_N$).

FIG. 1b shows a specific construct (11) applied to a typical email message such as a Simple Mail Transfer Protocol ("SMTP") message. The entire email is divided into three portions: header, body, and attachments. And, each portion is decomposed into constituent units: subject, to, from, route, time/date, new text, forwarded text, signature, attached $file_1$, $link_1$, etc.

With our process of data decomposition and decay, the constituent units of an email is archived or purged in stages (e.g. "decay stages") in order to retain the more pertinent constituent units for a longer period of time. This method:

(a) It establishes variable "shelf-life" of data constituent units. Whereas the term "shelf-life" traditionally is unknown and unused in data management, the present inventors hereby defining the term with respect to data management to mean the period of time, or other conditions, for which a constituent unit of data is considered valuable and useful, beyond which its value falls below a criteria such as relevance, usefulness, importance, etc. While known document expiration techniques may help treat the symptoms of increasing data by implicitly constraining the size of entire data units, such techniques do not address the root of the problem discovered by the inventors: that all data is treated equally, when in fact it is not equal. Some data units are of little value when others are critical. By allowing constituent units of data items to degrade at different rates according to their defined shelf-lives, the composure of the data item can be more highly weighted toward important, highly relevant data, while deleting less relevant data over time.

(b) It mimics the priority applied during manual user deletion. When an absolute size limit is reached, a user may be warned that he or she must purge the data in order to make way for other incoming data or face the consequences. These users do not blindly delete emails based only on simple rules like age or size, rather they may choose to delete email by factors including age, size, need, reproducibility, and other characteristics. By allowing constituent units of data items to decompose based on the same criteria, the automatic purging/archival process can emulate and reflect the priority of the users that are being served.

(c) It preserves key parts of data. By allowing the most vital content of the data to be preserved until the last stage of decomposition, the time window of availability to most important pieces of data is lengthened.

Aging data in this manner allows it to degrade gracefully over time. At each stage of decomposition less vital features of the data "flake off" and disappear automatically, retaining only the constituent units of the data which captures the essence of the content, which is most important, which is least reproducible, which is most recent or least stale, etc.

Process Configuration

Figure 2:
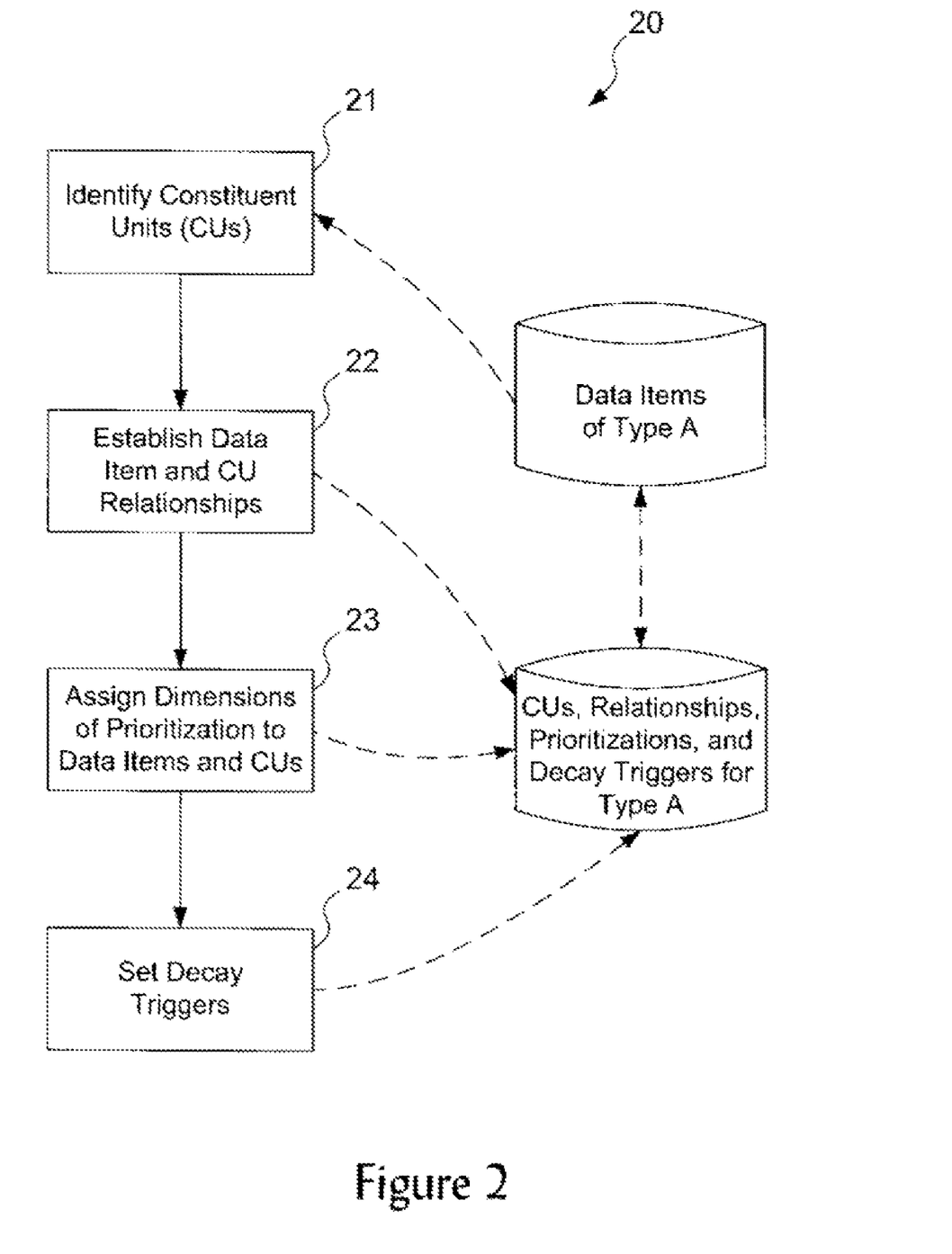
FIG. 2 illustrates a logical process according to the invention for configuring decomposition schemes, dimensions of prioritization, and decay triggers.

According to a first aspect of the invention, a user, an automated analyzer, or both a user and automated analyzer perform several steps to configure the invention, as shown (20) in FIG. 2:

(21) Identify constituent units (CUs) of decomposition for a specific type of data item. For example, when data_item_type="email", then portions include header, subject, body, attachments, thread_identifier, etc., and CU's include subject, TO:, FROM:, route, time/date, new text, forwarded text, included text, $file_1$, etc. External metadata that may not be part of the data constituent unit, but rather is system data, may optionally be included as CUs or as part of CUs, as well. For example, if an email has not been read yet, then this might be a factor in determining its decomposability index.

Figure 3:
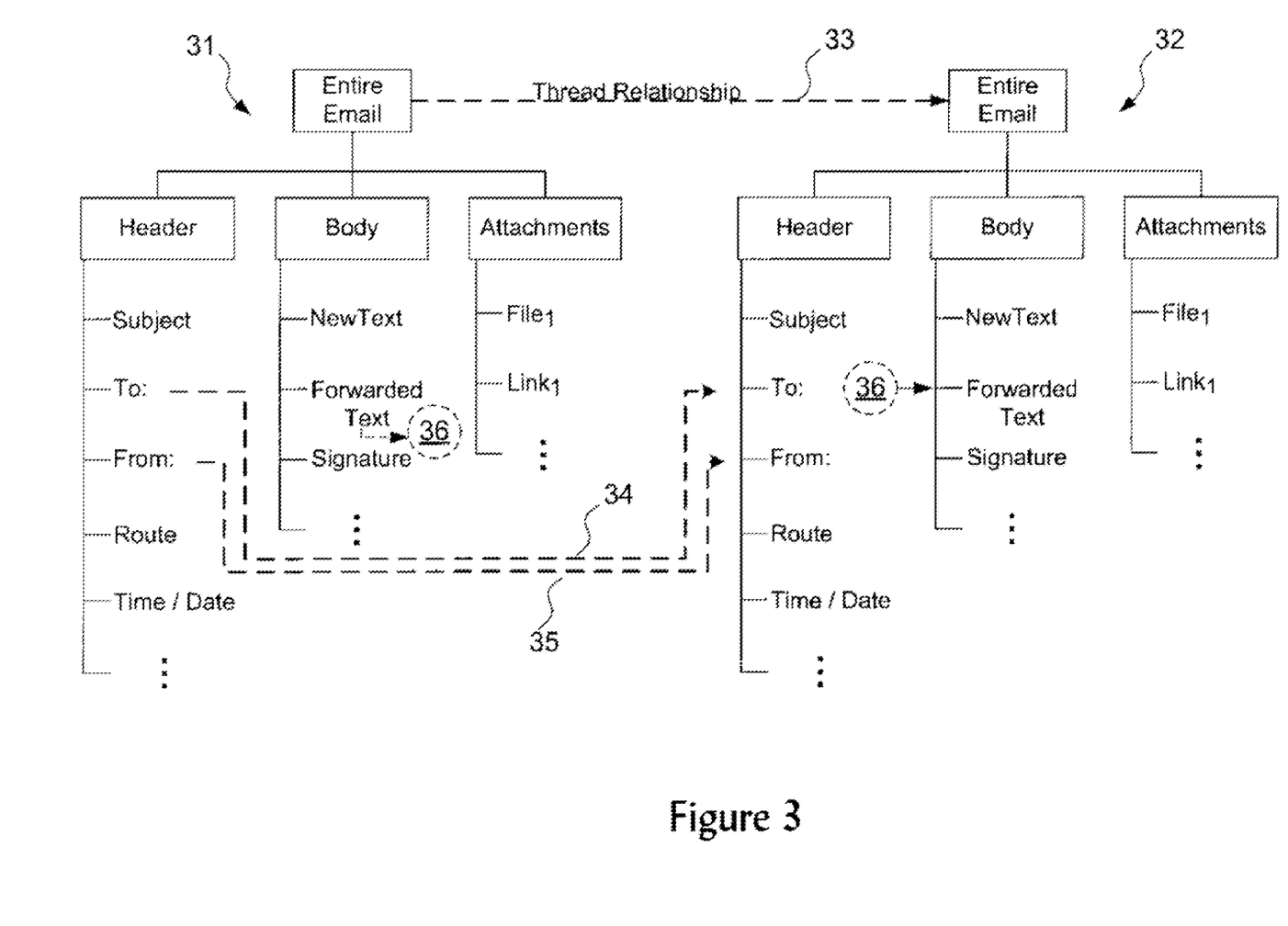
FIG. 3 illustrates relationship factors between multiple data items and constituent units.

(22) Establish relationships of each data item to each other data item, as well as between CUs. For example, FIG. 3 shows two email messages (31, 32), which are related by being part of a thread (33) of discussion. As such, the thread relationship (33) establishes a data item to data item relationship. And, as shown in FIG. 3, the TO:, FROM: and forwarded text CUs of the data items are related to each other (34, 35, and 36, respectively), thereby establishing a second level of relationships between constituent units and constituent units. Constituent units within the same data item can also be related to each other, such as discussed in the foregoing example of a quote and a footnote.

(23) Assign dimensions of prioritization to each data item and to each CU within each data item. These dimensions are used to compare data units and select which is most appropriate for decomposition. For example, one may define dimensions:

Reproducibility—mailing list archive?
Importance—sender? marked high-importance?
Time-sensitive—related to task due date?
Staleness—does the data still contain relevant information?
Relative size—<1 MB, 1-5 MB, >5 MB
Distribution—# of other receivers?

(24) Set and enable decay triggers. For example, decay (deletion of CUs) can be based on a scheduler, based on resource constraints, or combinations of conditions (e.g. available storage space, age of CUs, volatility of CUs, staleness, etc.).

Run-time Logical Process

After data items have been configured (20), the same or a different system performs a process to automatically maintain the data over time.

Figure 4:
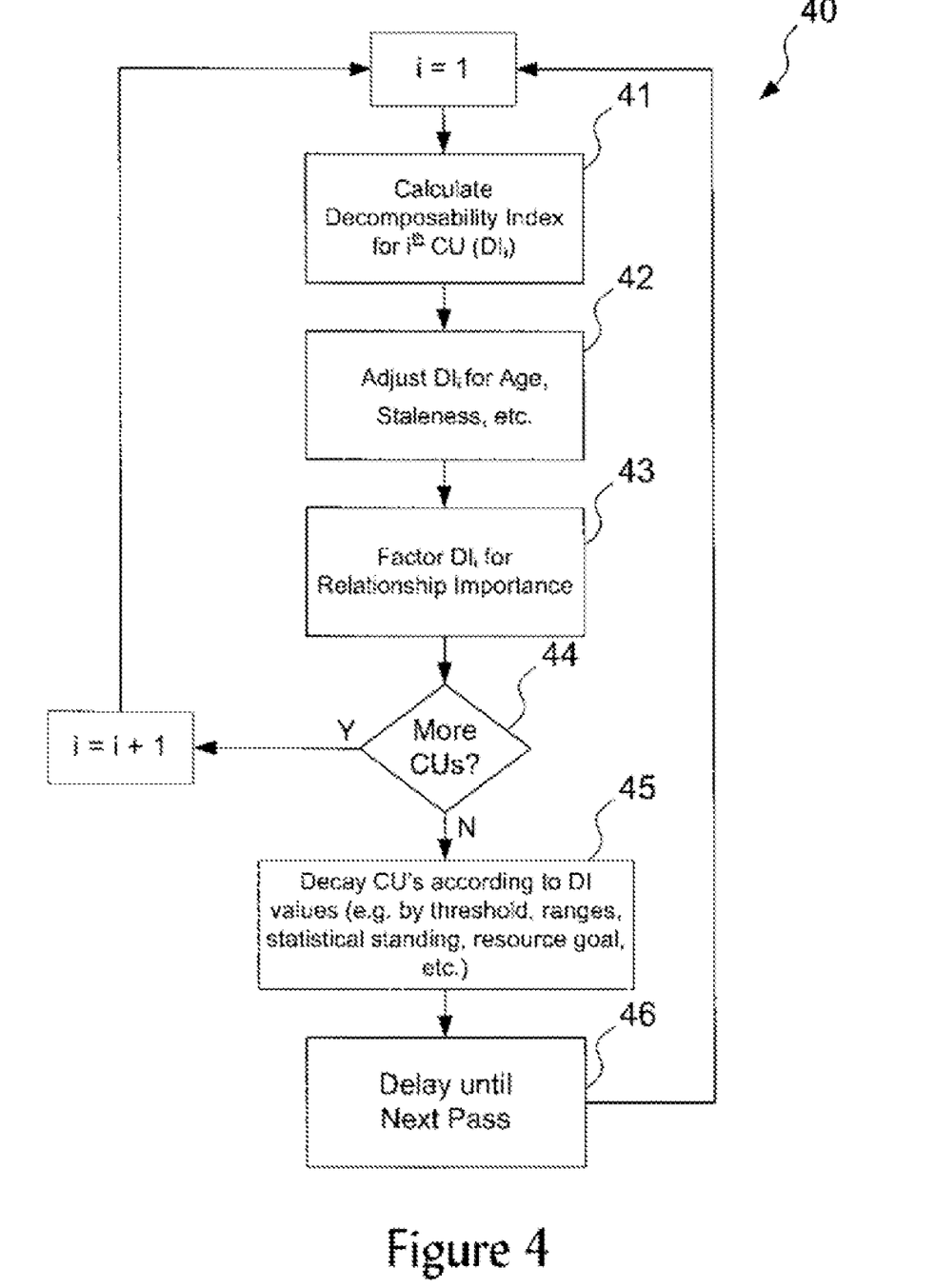
FIG. 4 sets forth a logical process according to the invention for analyzing the decomposability of constituent units, and for decaying those units according to the configuration established by a process such as that illustrated in FIG. 2.

The following process (40) as shown in FIG. 4 can be executed periodically, continuously, upon user or administrator command, or as triggered by other conditions (e.g. low resource alert, disk full alert, etc.):

(a) For each data item currently stored, calculate (or update) (41) a decomposability index $DI_1$ for each of its constituent units through a function of the priority dimensions defined for the individual units and data items, including but not limited to adjusting the DI value for data life dimensions (e.g. age of the item, staleness of the item, etc.) (42). Priority dimensions provide a mechanism to assign individualized priority to each data item and each constituent unit for retention and deletion, while data life dimensions are dimensions which apply to all data items and constituent units.

(b) For each individual constituent units and its decomposability index calculated in step (41), apply (43) a relationship factor (e.g. multiplicative, additive, etc) of the decomposability indices of the configuration units to which its integrity or value is related. In this way, a piece of data which individually is not ranked high for preservation, but is necessary to a related piece of data ranked as high for preservation, will inherit preservation value from its relationships and may be ranked lower for decomposition accordingly.

(c) If there are more constituent units to be updated or analyzed (44), then steps (41)-(43) are repeated for each data item being stored and managed.

(d) Based on the established system configuration (e.g. scheduled management, management action triggered by resource-based interrupts, etc.), perform decay (45) of the data units by deleting or archiving all constituent remaining in the storage units which have decomposability indices that meet a criterion such as being above a threshold, falling within an upper percentage of indices, etc. In this way, the next least valuable configuration items, or most reproducible items, are deleted or archived, which implements the next stage of decay of the data items in the storage.

(e) Steps (41)-(44) are repeated over time, and optionally responsively to resource constraint events, in order to continuously decay data items by updating their decomposability indices and deleting or archiving (e.g. decaying) constituent units having the indices indicating a lower preference for preservation. In one available embodiment, steps (41-45) may be repeated until resource objectives are met, such as decaying low-preference data until a certain amount of disk space or memory is freed up.

When new data is introduced into the system, the system preferably analyzes it, assigning it a decomposability index, upon entry to ensure that it is prioritized appropriately relative to the decaying pre-existing data. For example, new but unimportant data may take decomposition priority over pre-existing data that is already significantly decomposed but of high importance.

Example Method of Use and Operation

For example, consider a data warehouse containing 2 million email messages, that these stored email messages have been decomposed into constituent units as described earlier (e.g. decomposed into SUBJECT, TO, FROM, ATTACHMENTS, etc.), and that an owner of each message has set at least one priority dimension for some of the CUs in the messages. Further assume for the sake of this example that relationships have been configured, such as thread relationships, between some of the store emails. So, if each email has an average of 10 constituent units, then a total of 20 million constituent units are stored initially, along with prioritization dimensions and relationship factors for each CU.

Now, as the system executes over time and responsive to resource constraint events, each CU is continuously evaluated to update its decomposability index. In each pass of the decaying process, CUs having high priority for retention will have low decomposability indices, especially CUs which have high priority and which are related to other high priority CUs. Other embodiments may utilize other scales for the index, as previously described, such as scales which establish an inverse relationship between decomposability and retention preference (as in our examples), or which establish a non-inverse relationship between decomposability and retention preference. It is within the skill of those in the art to adjust the example logical processes to accommodate such selections of indices ranges, scales, and indicators.

In each pass, though, as low priority indices (e.g. indices of "7" or greater) for CUs are factored by their relationship factors to more important CU's, such as by subtracting one-half of the decomposability index of the higher importance CUs, their relative priority indices are decreased, which generally decreases their likelihood of being decayed (e.g. deleted) in this pass of the process. And, lower priority CU's which are not related to higher priority CU's will not have their priority increased through the relationship factoring, so their likelihood of being decayed in this pass of the process will remain high.

Further, in each pass, depending on configuration of the priority dimensions and triggers, each CU's decomposability index can be increased by a factor related to time or age of the CU in order to enhance its likelihood of being decayed.

Figure 5A:
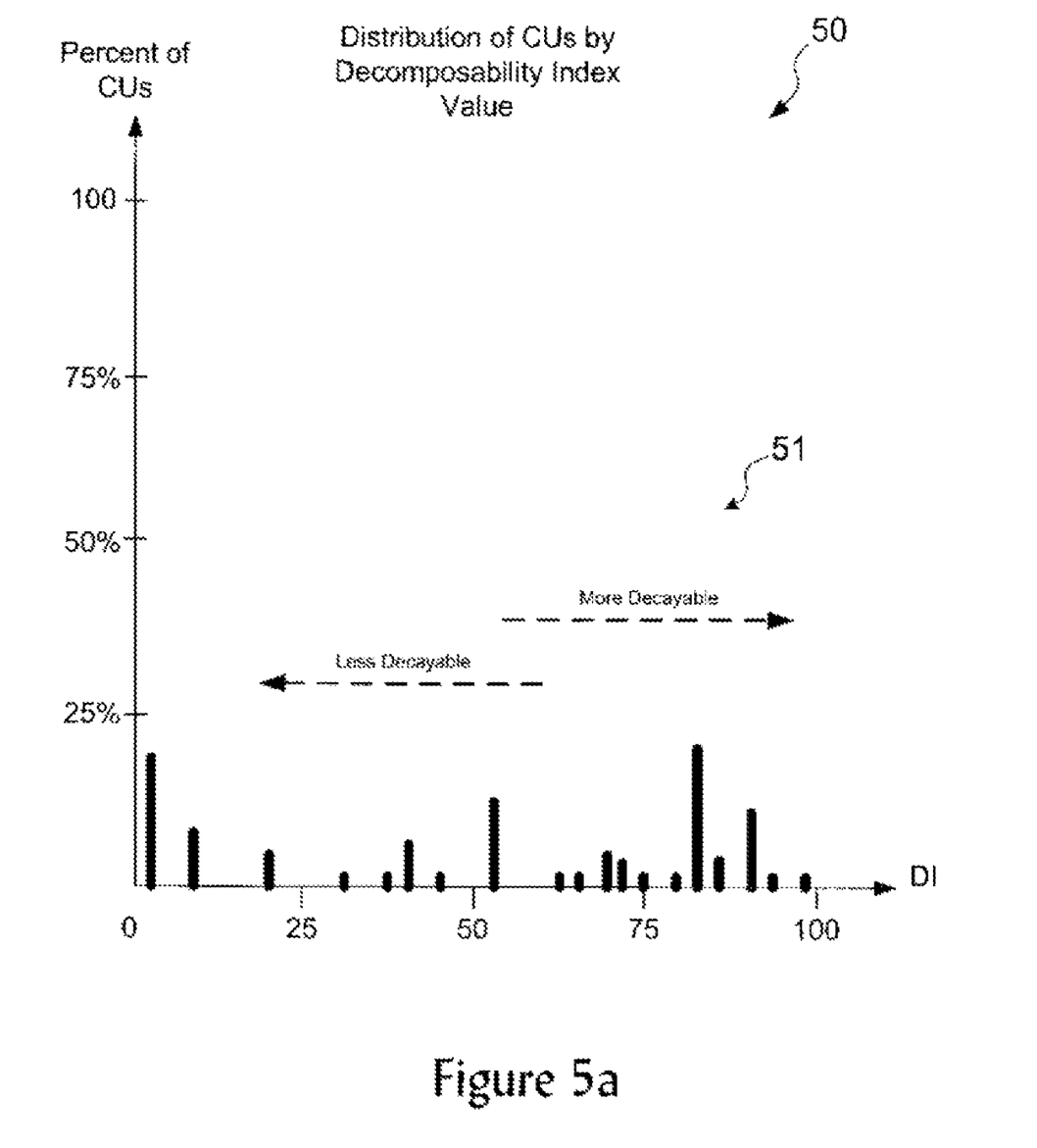
FIGS. 5a-5c depict a hypothetical distribution of constituent units by decomposability index, statistical analysis of such a distribution according to the present invention, and repetitious decay of data to achieve resource recovery.

Then, after all decomposability indices of all CUs have been established or updated, the process determines what the maximum decomposability index among the CUs is, and deletes or archives those having this maximum value. For example, this can be done statistically by analyzing the distribution (51) of the CUs by decomposability index, as hypothetically shown in FIG. 5*a*, where the total number of CUs under the curve (51) is the total number of CUs currently stored (20 million in this example).

Figure 5B:
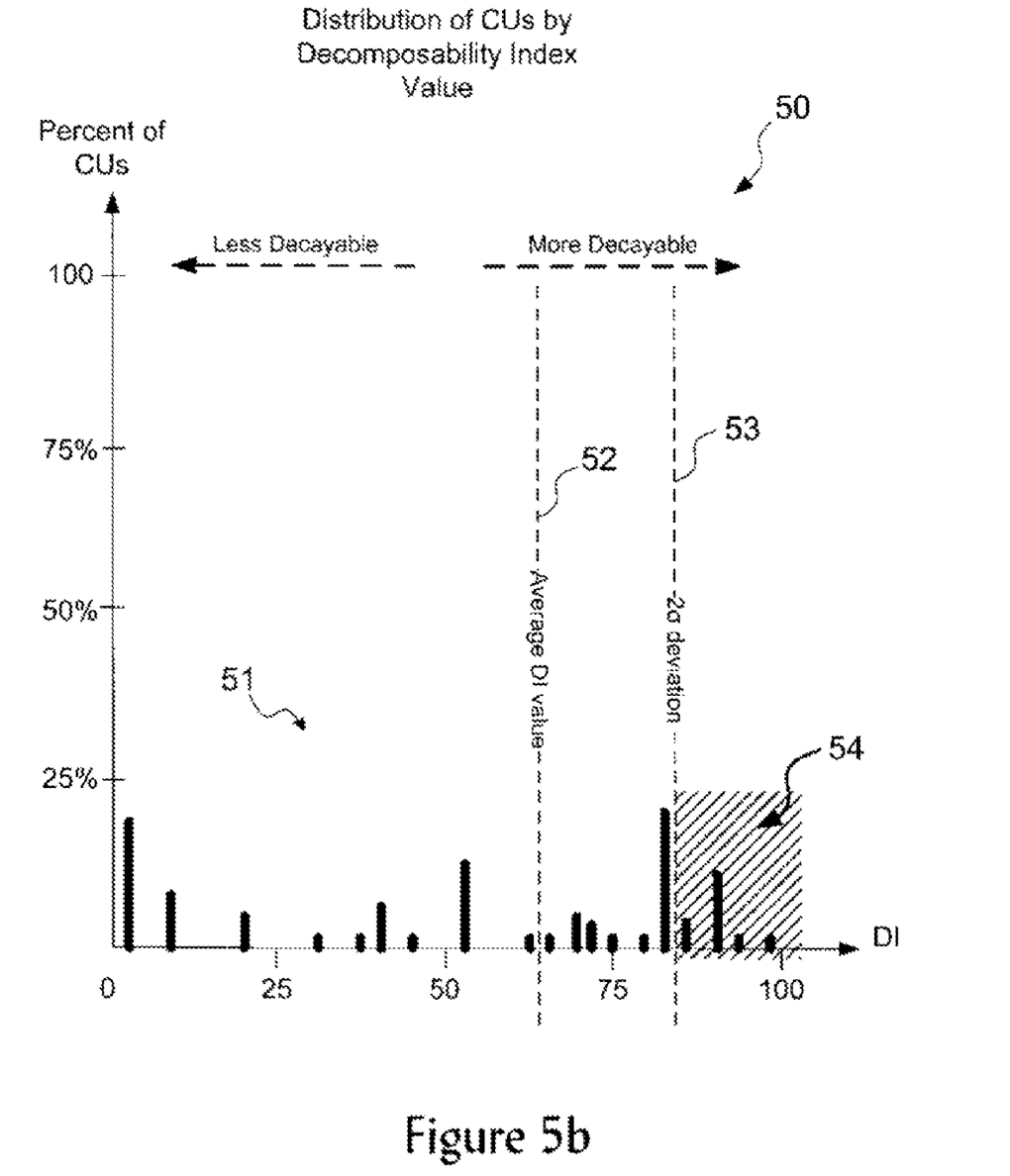
Figure 5C:
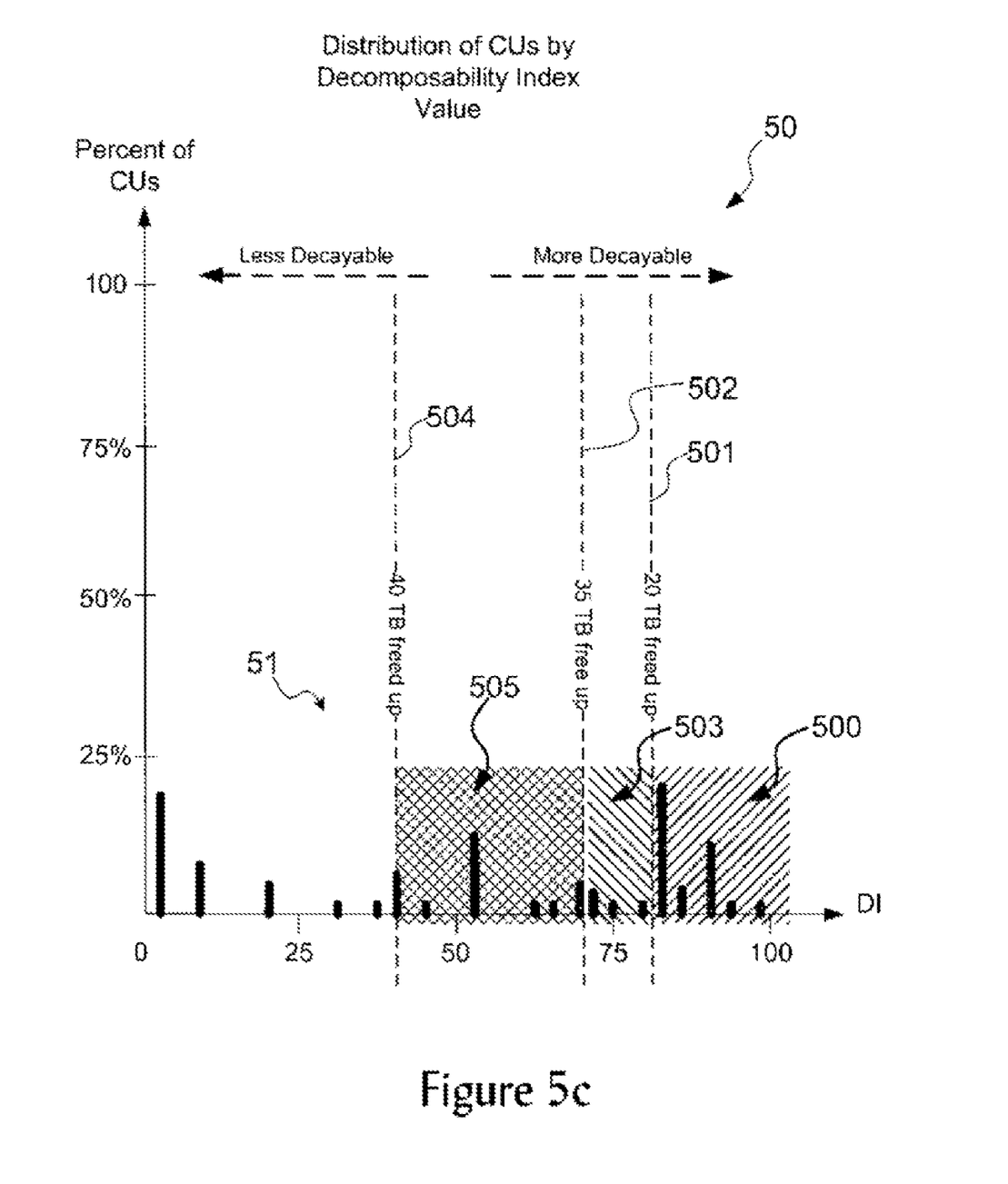

As shown in FIG. 5*b*, an average decomposability index (52) can be calculated, and then CUs having a decomposability index above (54) a certain statistical threshold (53), such as $2\pi$ (e.g. twice the standard deviation) can be decayed and deleted. In other embodiments or under different user configurations or commands, the decay process can be repeated until system resources are suitably recovered. For example, as shown in FIG. 5*c*, a first pass of decay (500) can be applied to recover a first amount of memory or disk space (501), but if the amount of resources recovered are not enough, then a second pass of decay (503) can be performed to recover even more resources (502), and a third pass (505, 505), and so forth until a predetermined amount of system resources are recovered.

Realization and Embodiment Options

The present invention may be realized in a variety of forms and modes to achieve many embodiments, all of which fall within the spirit and scope of the invention. The preceding examples are provided to illustrate a few of such embodiments.

Method Embodiments. The present invention may be embodied in fully-automated or partially-automated methods which are performed by one or more machines, computers, or devices. While some steps may require manual input, manual choices, or manual responses at junctions in logical processes, the automation of a method according to the invention is useful and provides a tangible result (e.g. freed up memory space which is physically available for additional data storage).

System Embodiments using a Suitable Computing Platform and Computer Program Code and/or Circuitry. The present invention is readily realized as a system employing software-implemented processes executed by a suitable computing platform, by logic implemented in circuitry, or by a combination of software, computers, and circuitry. Such platforms may include personal computers, such as those described in "How PCs Work" by Jeff Tyson, personal digital assistants such as those described in "How PDAs Work" by Carmen Carmack and Craig Freduenrich, Ph.D., or web servers such as those described in "How Web Servers Work" by Marshall Brain, both articles being published online by "How Stuff Works".

Circuitry using digital logic, and encoding data and instructions in a manner such as described in "How Bits and Bytes Work" by Marshall Brain may be employed to realize part or all of the invention, as well.

A "system" in this context refers not only to the software programs, but also the "hardware" componentry, including but not limited to one or more processors, memory, computer-readable media, busses, network interfaces, disk drives, display, and power supply. Further, such a "platform" will be understood to include any necessary operating systems, drivers, portable program interpreters, communications stacks, etc.

Computer-readable Media Encoded with Programs. In another embodiment, the present invention may be realized as one or more articles of manufacture, such as compact disks ("CD"), digital versatile disks ("DVD"), and downloadable programs. Software programs may be distributed from a source to a destination, such as by downloading from a server via a network connection to a client as described in "Downloading Software: An [sic] FAQ for Beginners", by Brian Satterfeld. After downloading software, it may be executed or processed by a suitable computing platform, such as the aforementioned platforms, to realize the invention in a system form, as well.

Computer programs, written in a suitable language such as "C" as described in "How C Programming Works" by Marshall Brain, or JAVA™ as described in "How Java Works" by Marshall Brain, executed by a processor, such as a microprocessor described in "How Microprocessors Work" by Marshall Brain, may be utilized for part or all of the present invention.

Such computer programs may be stored, encoded, transferred, transmitted, retrieved, read, and executed on, from, or in a variety of computer-readable and machine-readable media, such as computer memory, as described in "How Computer Memory Works" by Jeff Tyson, "Machine Readable", by Wikipedia, and "Machine Readable Medium" by Wikipedia. In the present context, "computer-readable medium" shall refer to any storage or transmission device, material, or physical signal capable of storing computer programs in part or whole, for any period of time, whether ephemeral or non-volatile, in a manner suitable for retrieving said programs for execution by a computing platform, whether the retrieving platform is the same platform which stored or encoded the programs, or whether the retrieving platform is a different platform than stored or encoded the programs Message Protocols for Embodiments. One embodiment of the present invention has been illustrated using examples of e-mail messages, such as Simple Mail Transfer Protocol ("SMTP") messages, such as the type of email described in "How E-mail Works" by Marshall Brain. The invention may be applied equally well to other messaging protocols.

Communications and Networks. The present invention has been described using examples of e-mail messages, which inherently includes Internet communications, such as described in "How Internet Infrastructure Works" by Marshall Brain, and "How OSI Works" by Jeff Tyson. The invention may be applied equally well to other types of networks, and communications schemes. For example, a computer-readable medium embodiment (e.g. article of manufacture) of the invention may be realized by encoding computer programs onto mass storage of a data processing system which acts as a server. Then, a system embodiment of the invention may be realized by first encoding the programs onto a communications network by the server, where a remote computing platform decodes the programs from the network and executes the decoded programs to form a system realization of the invention.

Grid and On-Demand Computing. The present invention is especially suitable for implementation in on-demand or grid computing environments, such as those described in "Grid Explained" by John Palfreyman of International Business Machines Corp., and especially to environments such as data centers, such as that described in "Data center" by Wikipedia. Grid and on-demand computing are well known in a general sense in the art. The present invention may be realized in an on-demand or grid embodiment by equipping one or more grid or on-demand servers with the computer programs, circuitry, or combination of programs and circuitry as described in the foregoing paragraphs, such that the method of the invention may be executed by the grid or on-demand computing system.

Application Service Provider Embodiment. The present invention may also be realized as a service provided to a client device, such as to a web browser from an application service provider's server, such as a ASP described in "How ASPs Work" by Marshall Brain. In such an embodiment, the invention encompasses automated business processes to receive information for processing, such as receiving pointers or access to an area of data storage to be decomposed and decayed, performing the logical processes as mentioned in the foregoing paragraphs, and collecting a fee or credit from a client for completion of the processing.

CONCLUSION

While certain examples and details of a embodiments have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A method for data management through decomposition and decay comprising:
    decomposing by a data maintenance system a type of data item by identifying constituent units of the data item, wherein the data maintenance system comprises a microprocessor;
    creating by the data maintenance system a shelf-life criterion for the constituent units by assigning one or more priority dimensions each data item and to each constituent unit, establishing one or more data life dimensions applicable to all the data items and constituent units of the data item type;
    establishing by the data maintenance system relationship factors for each of a plurality of data items to other data items, and relationships between constituent units within data items and between data items;
    for each of a plurality of data items of the data item type currently stored by data storage system, wherein the data items occupy an amount of computer storage, periodically calculating or periodically updating a decomposability index by the data maintenance system for each constituent unit as a function of the priority dimensions, the relationship factors and the data life dimensions, wherein the decomposability indices are additionally moved towards a threshold for constituent units which are reproducible; and subsequent to the calculating or updating, decaying by the data maintenance system the data type by periodically deleting from the computer storage all constituent units which have decomposability indices exceeding a configured threshold, the decay reducing the amount of computer storage occupied by a remaining plurality of data items of the data type.

2. The method as set forth in claim 1 further comprising repeating by the data maintenance system the calculating, updating, applying, optionally adjusting, and performing decay to maintain the data items.

3. The method as set forth in claim 2 wherein the calculating or updating a decomposability index by applying a relationship factor according to the relationship factors comprises inheriting by the data maintenance system a decomposability index from a related constituent unit which decreases its decomposability index.

4. The method as set forth in claim 2 wherein the calculating or updating a decomposability index by applying a relationship factor according to the relationship factors comprises inheriting by the data maintenance system a decomposability index from a related constituent unit which increases its decomposability index.

5. The method as set forth in claim 1 further comprising repeating by the data maintenance system the decomposing, and creating a shelf-life criterion for a newly received or newly stored type of data item.

6. The method as set forth in claim 1 wherein the decomposing comprises decomposing by the data maintenance system an electronic mail message into a plurality of constituent units selected from a group consisting of a message author field, an addressee field, a carbon copy addressee field, a blind copy addressee field, a routing description, a time stamp, a data stamp, a block of new text, a block of forwarded text, and an attachment.

7. The method as set forth in claim 1 wherein the assigning prioritization dimensions comprises assigning by the data maintenance system a dimension selected from a group consisting of importance, time-sensitivity, staleness, relative size, and breadth of distribution.

8. The method as set forth in claim 1 further comprising setting and enabling by the data maintenance system a decay trigger selected from a group consisting of a schedule-based trigger, a resource-constraint trigger, an age trigger, a staleness trigger, and a volatility trigger.

9. The method as set forth in claim 1 wherein the incrementing each decomposability index for one or more data life dimensions comprises incrementing according to a dimension selected from the group consisting of age, size, staleness, and volatility.

10. The method as set forth in claim 1 wherein the decaying data items is performed on a basis selected from the group consisting of a scheduled basis, a periodic basis, a resource-limitation basis, and a system-alert basis.

11. The method as set forth in claim 1 wherein the decaying of data items is repeated until a predetermined amount of system resources are recovered.

12. A computer program product for data management through decomposition and decay comprising:
a non-transitory tangible, computer readable storage device; and first program instructions to decompose by a portion of a data maintenance system a type of data item by identifying constituent units of the data item;

second program instructions to create by a portion of a data maintenance system a shelf-life criterion for the constituent units by assigning one or more priority dimensions each data item and to each constituent unit, and establishing one or more data life dimensions applicable to all the data items and constituent units of the data item type, and for establishing relationship factors for each of a plurality of data items to other data items, and relationships between constituent units within data items and between data items;

third program instructions to, for each of a plurality of data items of the data item type currently stored by data storage system, wherein the data items occupy an amount of computer storage, periodically calculate or periodically update a decomposability index for each constituent unit as a function of the priority dimensions, the relationship factors and the data life dimensions, wherein the decomposability indices are additionally moved towards a threshold for constituent units which are reproducible; and fourth program instructions to, subsequent to the calculating or updating, decay the data type by periodically deleting from the computer storage all constituent units which have decomposability indices exceeding a configured threshold, the decay reducing the amount of computer storage occupied by a remaining plurality of data items of the data type;

wherein the first, second, third and fourth program instructions are stored on the non-transitory tangible, computer readable storage device.

13. The computer program product as set forth in claim 12 wherein the program instructions are stored in a first non-transitory tangible computer readable storage device, and
wherein the program instructions subsequently are downloaded over a network to a second non-transitory tangible, computer readable storage device.

14. The computer program product as set forth in claim 13 wherein the program instructions stored in the second non-transitory tangible, computer readable storage device are executable by a client device.

15. The computer program product as set forth in claim 13 wherein the first non-transitoy tangible, computer readable storage device is associated with a server device.

16. A system for decomposing and decaying data over time in a data storage system comprising:
a non-transitory tangible, computer storage device portion of a data maintenance computer system containing decomposition identifications of constituent units for a type of data items, wherein the data maintenance system includes a processor;

a shelf-life criterion stored in a tangible computer memory device of the data maintenance system associated with the portion of a data maintenance system assigning one or more dimensions of prioritization to each data item and to each constituent unit, and establishing one or more data life dimensions applicable to all data items and constituent units of the data item type;

a plurality of relationship factors stored in a tangible, computer memory device of the data maintenance system for relationships of each of a plurality of data items to other data items, and for relationships between constituent units within data items and between data items;

a decomposability analyzer portion of the data maintenance system for periodically calculating or periodically updating a decomposability index for each constituent unit of each of a plurality of data items currently stored by a data storage system occupying an amount of data storage as function of the priority dimensions, the relationship factors and of the data life dimensions, wherein the decomposability indices are additionally moved towards a threshold for constituent units which are reproducible; and a data decayer portion of the data maintenance system for periodically deleting or archiving all constituent units which have decomposability indices exceeding a configured threshold, the data decayer reducing the amount of computer storage occupied by a remaining plurality of data items of the data type.

17. The system as set forth in claim 16 which further decomposes an electronic mail message into one or more constituent units selected from the group consisting of a message author field, an addressee field, a carbon copy addressee field, a blind copy addressee field, a routing description, a time stamp, a data stamp, a block of new text, a block of forwarded text, and an attachment.

18. The system as set forth in claim 16 comprising one or more decay triggers selected from the group consisting of a schedule-based trigger, a resource-constraint trigger, an age trigger, a staleness trigger, and a volatility trigger.

19. The system as set forth in claim 16 wherein the dimensions comprise a dimension selected from the group consisting of reproducibility, importance, time-sensitivity, staleness, relative size, and breadth of distribution.

* * * * *